United States Patent [19]

Fiala

[11] Patent Number: 5,165,442
[45] Date of Patent: Nov. 24, 1992

[54] DIFFERENTIAL VALVE

[76] Inventor: Roger Fiala, 2236 Electra Ave., Simi Valley, Calif. 93065

[21] Appl. No.: 659,896

[22] Filed: Feb. 25, 1991

Related U.S. Application Data

[62] Division of Ser. No. 395,321, Aug. 17, 1989, Pat. No. 5,009,244.

[51] Int. Cl.$^5$ ............................................. G05D 11/03
[52] U.S. Cl. ............................. 137/118; 137/101.11; 137/512.2; 137/564.5
[58] Field of Search ............... 137/101.11, 110, 117, 137/118, 205.5, 564.5, 538, 512.2

[56] References Cited

U.S. PATENT DOCUMENTS

| | | | |
|---|---|---|---|
| 919,036 | 4/1909 | Langer | 137/512.2 X |
| 2,556,829 | 6/1951 | Teague | 137/117 |
| 2,571,476 | 10/1951 | Offutt | 137/564.5 X |
| 2,813,401 | 11/1957 | Smith | 137/117 X |
| 3,500,854 | 3/1970 | Altmeppen | 137/118 |
| 5,009,244 | 4/1991 | Grindley | 137/101.11 |

FOREIGN PATENT DOCUMENTS 936956  9/1963  United Kingdom ............. 137/564.5

*Primary Examiner*—Robert G. Nilson
*Attorney, Agent, or Firm*—Wagner & Middlebrook

[57] ABSTRACT

A fire fighting foam proportioner for use in providing precise proportioning of foam to fire fighting liquid, e.g. water, is disclosed. It includes a tank for the storage of foam concentrate which is loaded using a hand pump. The storage tank is coupled to a fire fighting line through a differential pressure responsive valve in the fire fighting line and a proportioning valve used to select the foam concentration desired, for example 0.2 to 1 percent of the fire fighting liquid. The differential pressure responsive valve applies discharge pressure to the foam concentrate as a function of the fluid flow through the line and therefore provides precise flow concentration maintenance despite changes if flow and line pressure. The differential pressure responsive valve includes to coaxial valving members and low and high pressure ports which are coupled to control the discharged pressure to the tank. The proportioner valve include a rotor with a continuous variable groove for precise control.

3 Claims, 7 Drawing Sheets

MAX (1.0)

MIN (0 TO .2)

VALVE
CLOSED
(OFF)

DIFFERENTIAL VALVE

This is a divisional of copending application(s) Ser. No. 07/395,321 filed on Aug. 17, 1989, now U.S. Pat. No. 5,009,244.

BACKGROUND OF THE INVENTION

1. Field of the Invention

This invention relates to foam delivery systems for fire fighting use.

2. Description of the Prior Art

The addition of foaming agents to fire fighting water as a fire suppression agent has been recognized as early as the 1870's when the first such use was reported to have been patented in England. Since then, through the years, further advances have been made. These advances have included better understanding of the function of the foaming agent, the types of delivery systems and most significantly, the foam:water ratio for particular fire applications.

For many years, Class A type foams of the A-FFF type have never been used to combat fuel fires such as JP4 jet fuel, gasoline and diesel fuels. More recently, Class A foams, such as the agents sold under the trademark Sylvex of the Ansul company, have been found to increase the fire suppression efficiency of water by three to five times when used on both wildland and Class A structure fires. This recognition has greatly expanded the utility and usage of foam in fire fighting.

In the past, a fairly standard foam:water ratio of 6:94 was used and apparatus capable of maintaining such a ratio at various water flow rates was disclosed in a number of patents, such as 4,064,891 to Eberhardt and 4,448,256 to Eberhardt, et al. The '891 patent to Eberhardt discloses a balanced pressure valve. The '256 patent to Eberhardt, et al employs a positive displacement gear pump to maintain the standard ratio despite changes in flow rates.

More recently it has been recognized that foam:water ratios of 3:97 over flow rate variations of from 20 GPM to 1,000 GPM are needed and more complex proportioning valves such a shuttle type systems are illustrated by U.S. Pat. No. 4,633,895, also to Eberhardt.

With further development of foam suppression fire fighting, it has become apparent that foam:water ratios as low as 0.2:99.8 may be needed and precise proportioning at 0.2% increments up to a 1:99 ratio can be important in various applications.

The tremendous reduction in the ratio of foam to water with effective or enhanced effectiveness has several important results. First, existing foam handling and proportioning systems are incapable of such precise proportioning. One reason is that they are almost universally of an eductor or vacuum operated, if self powered, or subject to the variations of portable electrical power supplies. Secondly, the logistics of foam supply are greatly simplified because of the greatly reduced quantities used. In the case of airborne applications, such as helicopter or fixed wing air drops, the use of foam suppression is much more practical. Still remains the need for a simple, light-weight, self-powered foam supply and proportioning system.

BRIEF DESCRIPTION OF THE INVENTION

Faced with the foregoing state of the art, we have invented a new foam delivery system which is light-weight, self-powered, local positive pressure operated, non-electrical foam storage and proportioning system which provides precise mixing of foam and water at ratios as low as 0.2% and as high as 1% in 0.2% increments. The system may be inserted at any joint in a foam concentrate hose line and is particularly suitable for airborne fire fighting installations such as helicopters.

The system comprises basically a foam storage tank containing a bladder having for example, a five gallon foam concentrate capacity, a hand pump secured to the tank for filling the bladder, a three position selector valve, a metering valve and a differential valve, as well as the required piping and check valves. The selector valve provides for a) filling, b) foam delivery, and c) off.

A differential pressure valve includes a line coupling for insertion at any place in the fire line. It includes two pressure responsive valving members, one low pressure and the other high pressure responsive. At higher line pressure which causes both the low and high pressure valving members to permit flow through the line, water at full line pressure is applied to the tank to compress the bladder and increase the foam concentrate injection. At low water pressure the differential pressure valve functions to reduce foam concentrate injection.

In both cases, foam concentrate is supplied through a metering valve having a continuously variable helical groove defining the metering orifice size for precise foam:water proportioning.

BRIEF DESCRIPTION OF THE DRAWING

This invention may be more clearly understood from the following more detailed description and by reference to the drawing in which.

DETAILED DESCRIPTION OF THE INVENTION

Figure 1:
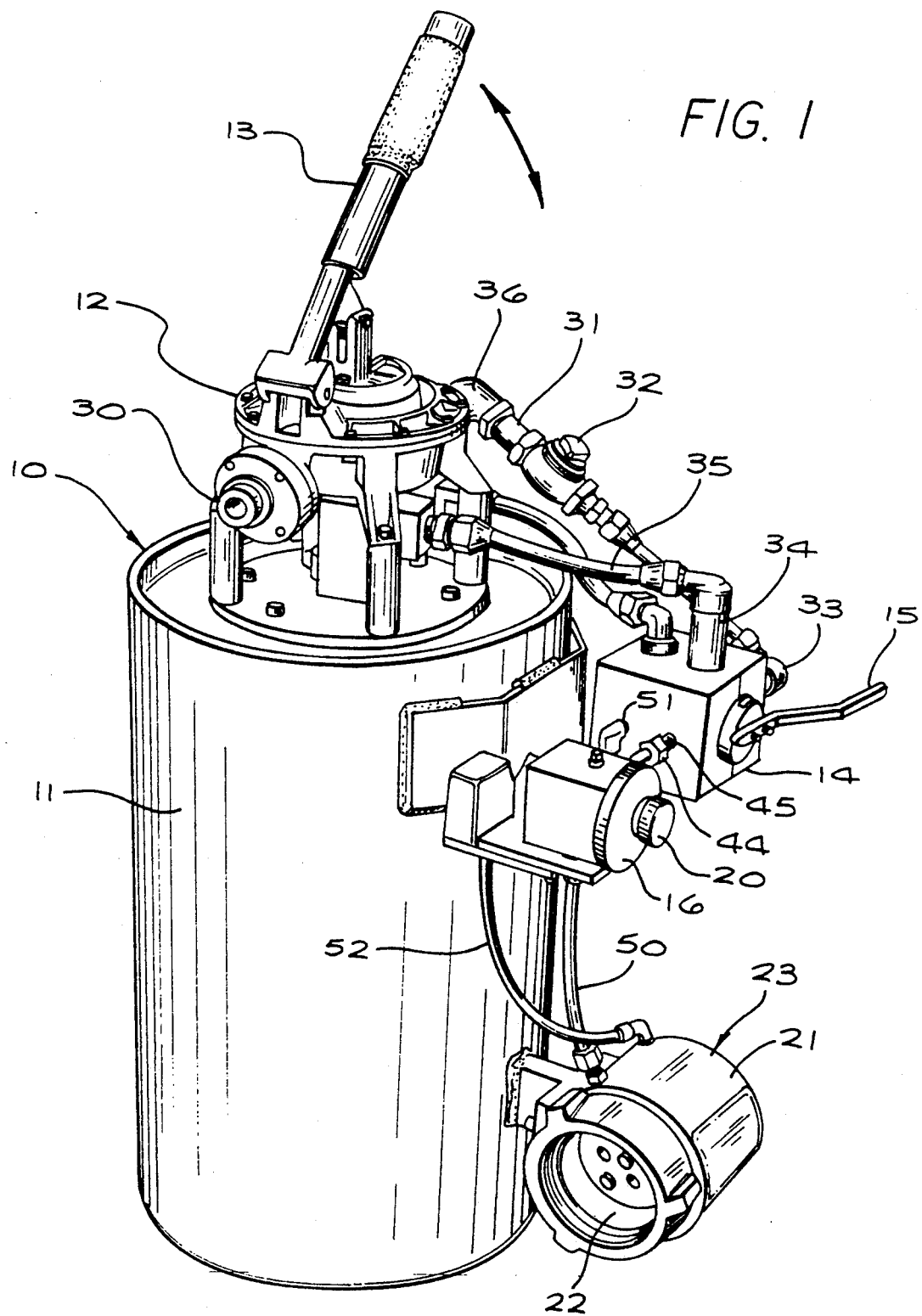
FIG. 1 is a perspective of the foam delivery system of this invention.
Figure 2:
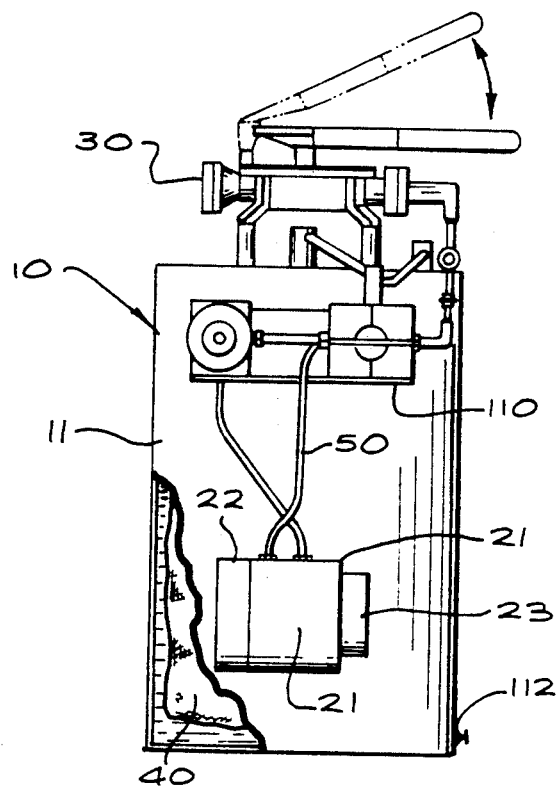
FIG. 2 is a side elevational view thereof.

Now referring to FIGS. 1 and 2 of the drawing, wherein a foam proportioner and injector, generally designated 10, is shown. The system, in its preferred embodiment, is in the order of fifty pounds in weight and requires a space in the order of thirty-two inches in height, maximum, and eighteen inches in maximum width whereby the system may be easily mounted on a fire truck and carried on airborne fire fighting equipment, as well. It provides precisely controllable injection of foam concentrate in the 0.1 to 1.0% range, regardless of the water flow from 3 to 120 gpm and with system pressure variations as great as from 60 to 125 PSI while maintaining the precise foam proportion.

The apparatus and components making up the system of FIGS. 1 and 2 include a body or canister 11 of sufficient size to hold a standard quantity of foam concentrate, for example five gallons, while affording additional space within the body or canister 11 for an air space and a bladder 40. The bladder 40 appears in FIG. 2 in the broken away section, but not in FIG. 1.

Very conveniently located on the top of the canister 11 is a hand operated pump 12, such as a BOZWORTH GUZZLER produced by the Bozworth company of Connecticut, is used to fill the canister 11 by operation of the handle 13 in the cyclicly up and down motion.

Also mounted on the body or canister 11 preferably on the side wall, are:

a) a three-way selector valve 14 having three positions namely, 1-REFILL, 2-FOAM and 3-OFF controlled by indexed handle 15;

b) a metering valve 16 with selector knob 20 controls the proportioning of the foam added to the fire fighting water in the 0.1 to 1.0% range; and c) a differential pressure valve 21 also mounted on the canister in line with the water flow path between its inlet 22 and its outlet port 23.

The differential pressure valve includes standard fire fighting hose fitting so that this apparatus may be connected in the hose line at any joint. Adapters may be added for other than a standard 2½ inch line.

Figure 3:
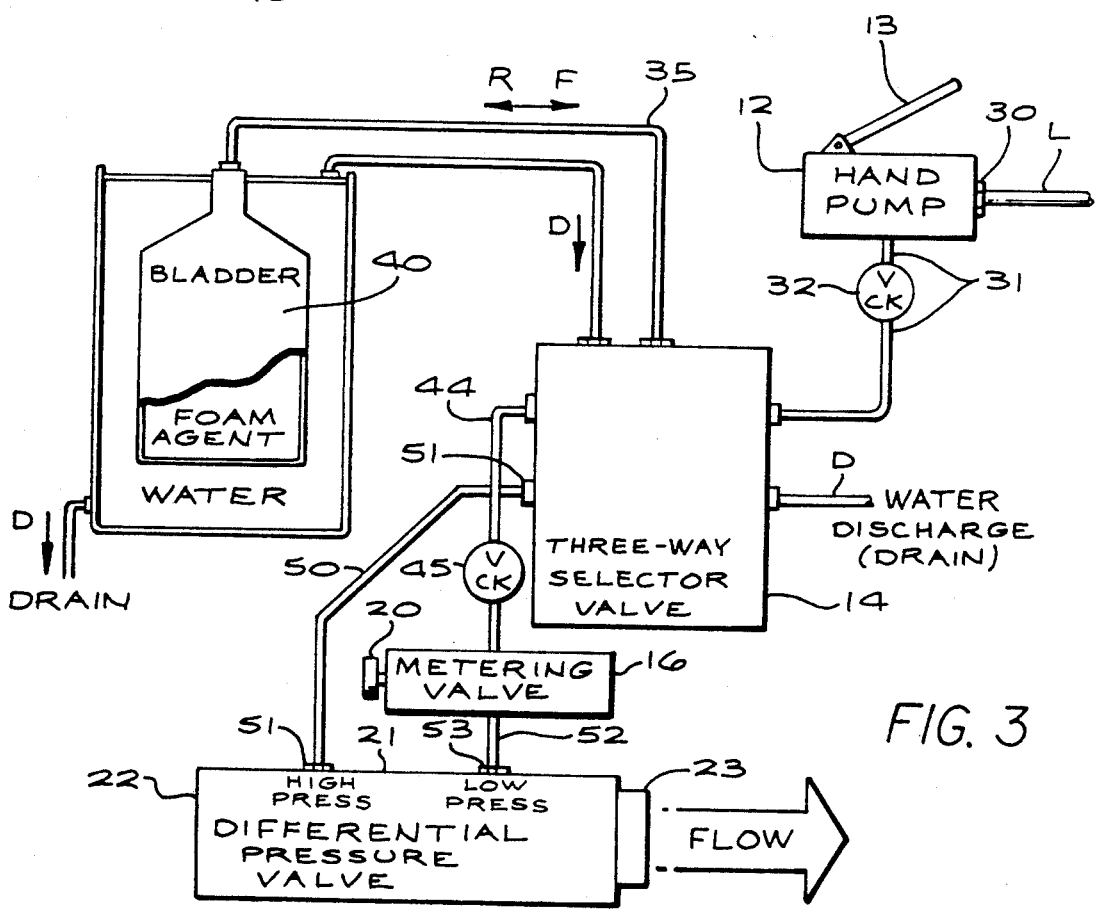
FIG. 3 is a schematic diagram of the system of FIGS. 1 and 2.

Now referring to FIGS. 1-3, the hand pump 12 includes a charging inlet 30 through Which foam concentrate is received via a line L of FIG. 3 from a supply drum (unshown) such as a five gallon drum of concentrate. The concentrate, which may be the product of the ANSUL WORMALD CORP. of Marionette, Wis. and sold under the trademark ANSUL, is pumped via hand pump 12 into the internal bladder 40 of FIGS. 2 and 3 displacing any water contained in the canister 11 out through line 17, valve 14 and water discharge drain 18 and filling the canister with its capacity, for example, five gallons through line 35. A flow path for the foaming agent from the canister 11 exists when the selector valve 14 is in its FOAM position with flow via conduit 35, selector valve 14, line 44, and check valve 45. The three way selector valve 14 is coupled to the metering valve 16 via line 44 and check valve 45.

A high pressure line 50 connects between the inlet side 22 of the differential pressure valve 21 and inlet fitting 51 of the selector valve 14. Line 52 connects between the outlet or low pressure side 23 of the differential pressure valve 21 and the outlet of the metering valve 16.

It should be noted that the system of this invention includes no electric motors and no power sources except the hand pump 12 and inlet pressure from the fire fighting water line. The positive pressure of the fire fighting line is used to positively pressurize the system for foam concentrate delivery.

In order for an understanding of the operation of this system as a whole, a brief review of the component parts is in order before undertaking system operation explanation.

MAIN TANK OR BODY

Figure 4:
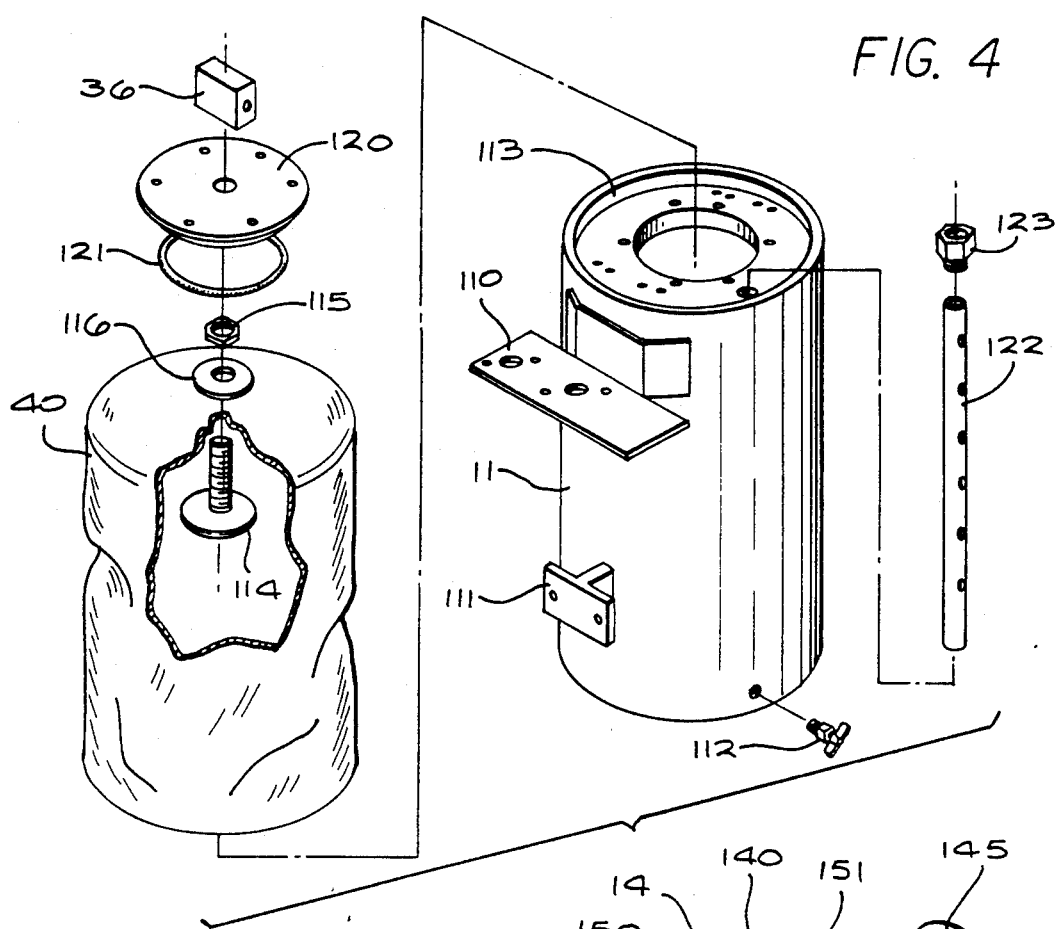
FIG. 4 is an exploded view of the tank and bladder of the system of FIG. 1.

Now referring to FIG. 4 the canister or body 11 may be seen with its drain pet cock 112 and its support brackets 110 and 111 for mounting the valve members. The canister 11 includes an upper port 113 through which bladder 40 may be collapsed and installed and sealed in place by flanged threaded tube 114, and securing nut 115 and washer 116. A cover plate 120 and sealing 0 ring 121 close the opening 113 in the top of the canister 11. The outlet port 36 is in threaded and sealed engagement with the outlet tube 114. A tube 122 and its securing fitting 123 complete the canister 11. The pet cock 112 is used to drain any residual water directly out of the canister 11 while the drain tube 122 is used to relieve Water pressure within canister 11 via the selector valve 14 during the bladder refill operation and to transmit water pressure via line 50, three-way valve 14 and line 17 to the interior of canister 11 during the foam discharge.

THREE WAY SELECTOR VALVE

Figure 5:
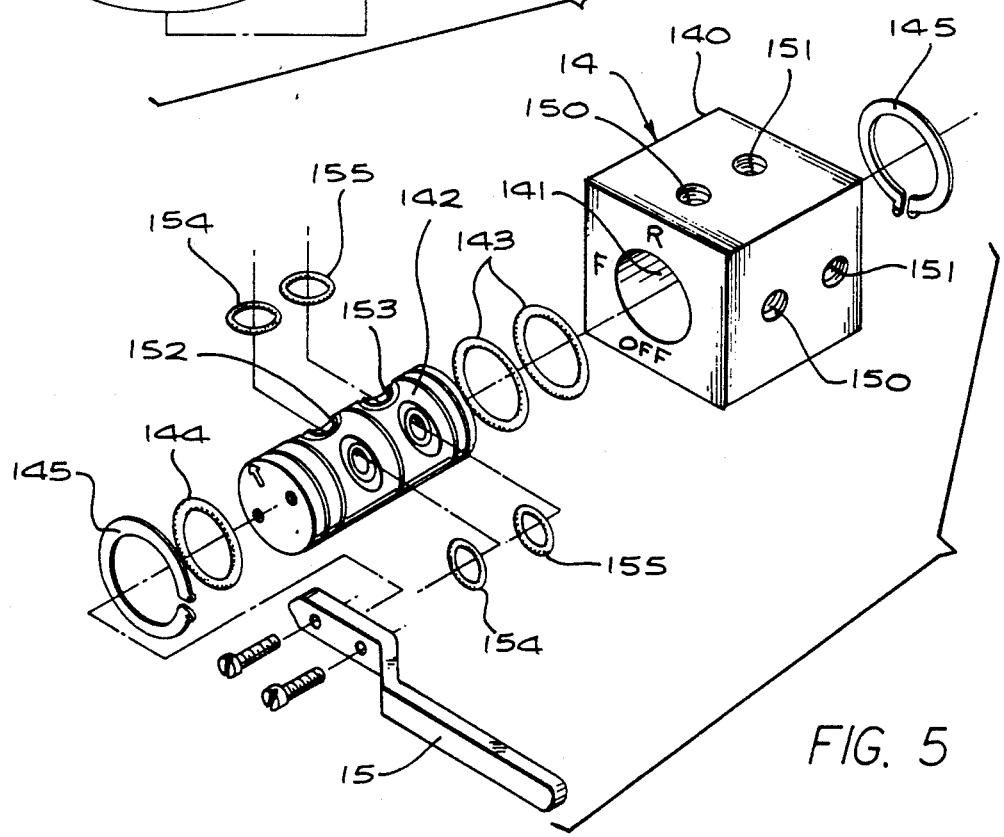
FIG. 5 is an exploded view of the three way selector valve of this invention.

The three way selector valve 14 in FIG. 5 may be seen as including a body 140 with an axial bore 141 into which a cylindrical valving member 142 is sealed by O rings 143 and 144 and secured longitudinally by locking C rings 145 at opposite ends. The body 140 includes two pairs of ports 150 and 151 while the cylindrical valving member 142 includes a pair of internal ports 152 and 153 each of which has O ring seats and O rings 154 and 155 respectively at the ends of the ports 152 and 153. Handle 15 is secured to the exposed end of the cylindrical valving member 142 to allow at least 270 degrees of rotation of the cylindrical valving member 142 to move the valve 14 into the three operating positions of REFILL, FOAM and OFF.

When horizontal, as shown in FIGS. 1 and 5, handle 15 is in the FOAM position (F) and flow is established between lines 35 and 44 through port 153 and between the lines 17 and 50 through port 152. When the handle 15 is moved to the REFILL position (R) flow is established between the line 31 and 35 and between the drain lines 17 and 18. When the handle 15 is moved to the OFF position, all ports are closed.

METERING VALVE

Figure 6:
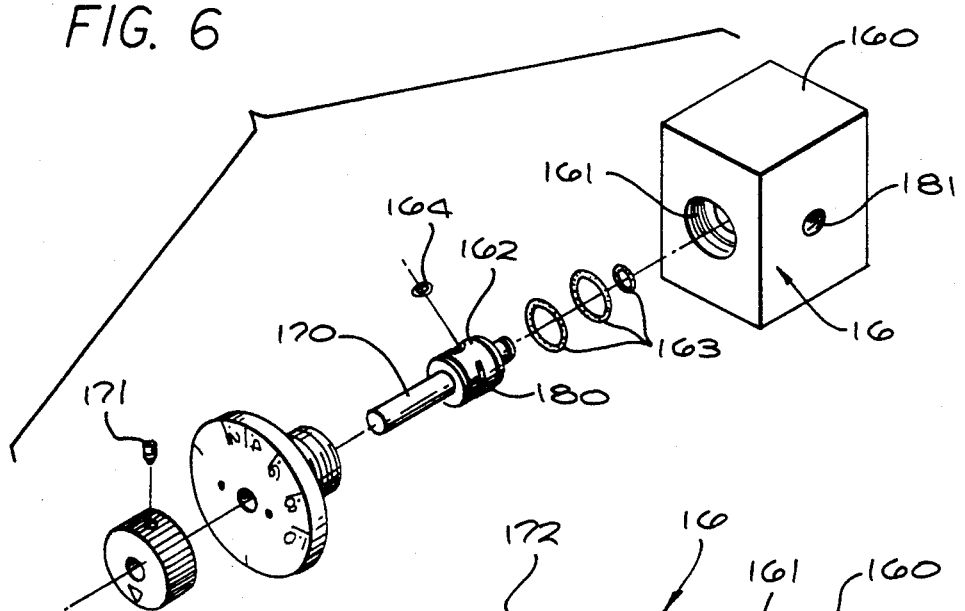
FIG. 6 is an exploded view of the metering valve of this invention.
Figure 7:
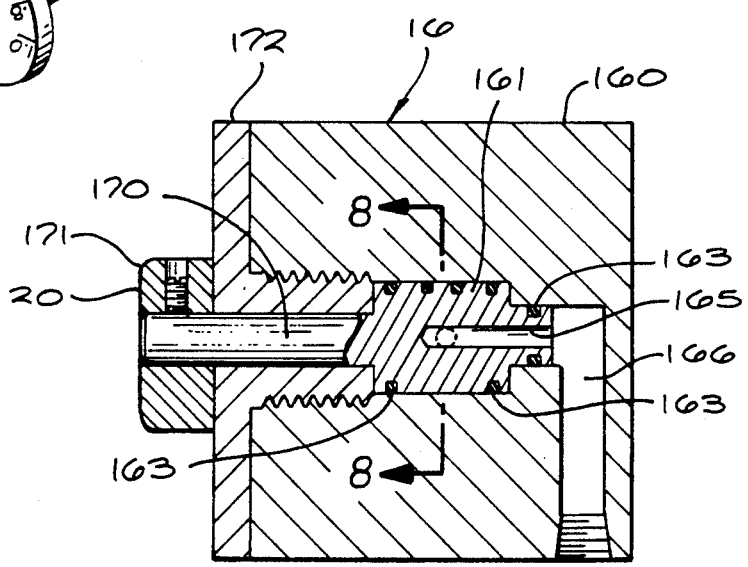
FIG. 7 is a vertical diametrical sectional view of the metering valve of FIG. 6.

For the operation of the systems effectively, there is needed an additional valve to the selector valve a precise metering valve and valve 16 of FIGS. 1 and 2 fills that need. It is further illustrated in FIGS. 6 through 8 and comprises a valve body 160 having a partially threaded cylindrical recess 161 therein which receives a cylindrical valving member 162 with required O ring seals 163 providing the longitudinal sealing and O ring 164 providing sealing around a radially extending port. Valving member 162 includes an axial opening 165 appearing in FIG. 7 which communicates with an outlet port 166 in the metering valve body 160 while inlet port 181 communicates with the recess 161. The valving member 162 includes an outward extended shaft 170 on which the control knob 20 is held by set screw 171. The metering valve 16 is closed by indexed covered plate 172 which also acts as a stop to prevent longitudinal movement of the valving member 162. As shown in FIG. 6, the metering valve 16 is graduated on 0.2% increments with these indexed marks acting as guides for the user. The valve 16 is continuously variable between 0 flow and 1% flow at the operator's choice.

Figure 8A:
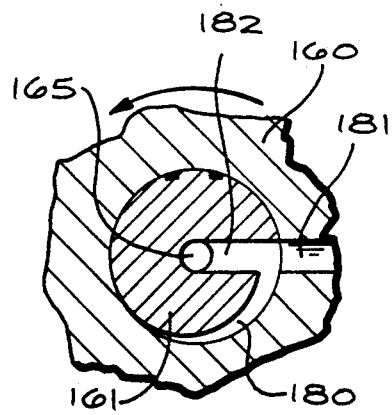
FIGS. 8a, b and c are fragmentary sectional views taken along line 8—8 of FIG. 7, showing the valve with three different levels of flow.
Figure 8B:
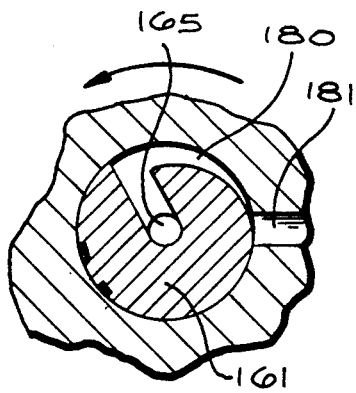
Figure 8C:
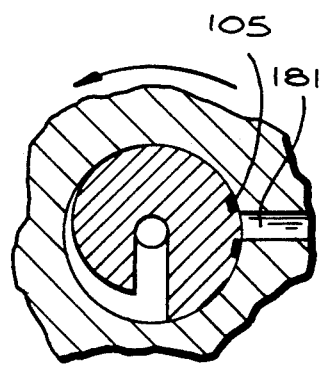

Precise control of the flow is accomplished by means of continuously variable groove 180, appearing in FIG. 6 but best seen in FIGS. 8a-c. The groove 180 is in the form of a circumferential groove of progressively increasing depth; the inner wall of which forms a partial helix extending around approximately 180 degrees of the cylindrical valve member 162 and allowing maximum flow as illustrated in FIG. 8a with the deepest cut of the groove 180 positioned so that there is a direct flow path between the inlet port 181 in the valve body 160 and a radial port 182 in the valving member 161 communicating with the axial port 165. As illustrated in FIG. 8b, as the valving member is rotated counterclockwise a smaller cross-sectional portion of the groove 180 is interposed in the flow path between the inlet port 181 and the longitudinal port 165. The variation in flow is uniform as the variation in cross-sectional area of the groove 180 changes. Any position beyond either end of the groove 180 provides a virtual seal however, in the OFF position as illustrated in FIG. 8C, O ring 185 seals the end of port 181. If a particle or some foreign material becomes lodged in the metering valve, it may be easily cleared by moving the valve control to maximum flow. This provides the maximum orifice opening directly to the outlet port allowing the foreign material to be immediately flushed away. The metering valve may then be reset to its selected proportion value.

DIFFERENTIAL PRESSURE VALVE

Figure 9:
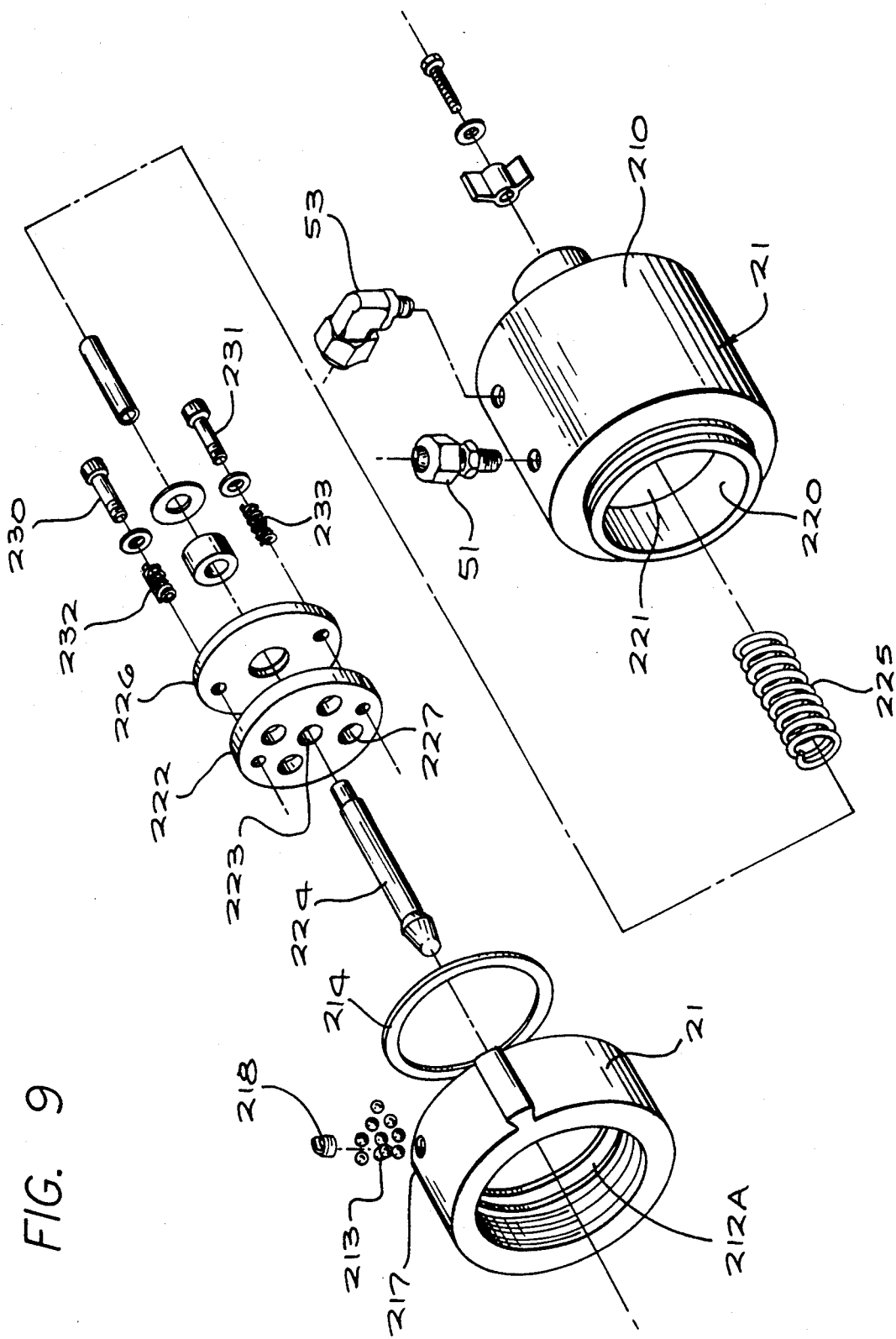
FIG. 9 is an exploded view of the differential pressure valve of this invention.
Figure 10:
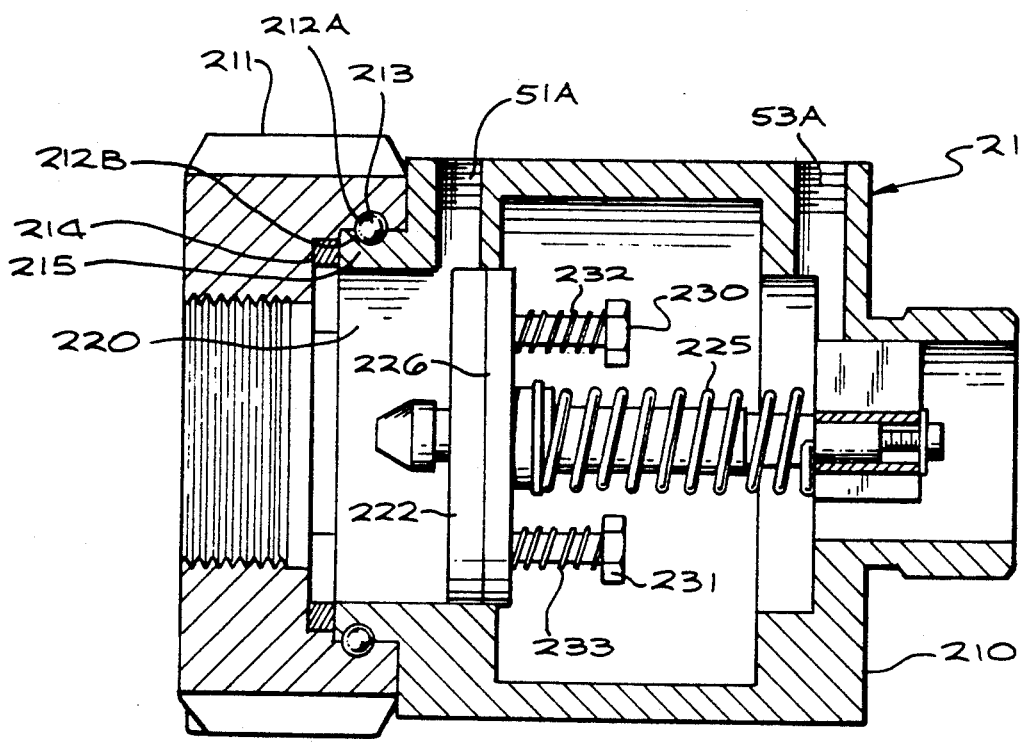
FIGS. 10, 11 and 12 are three simplified vertical sectional views of the differential pressure valve of this invention shown in closed, low-pressure, and high-pressure condition, respectively
Figure 11:
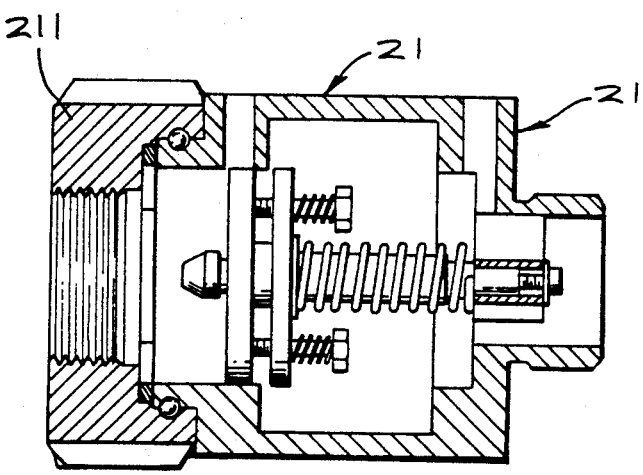
Figure 12:
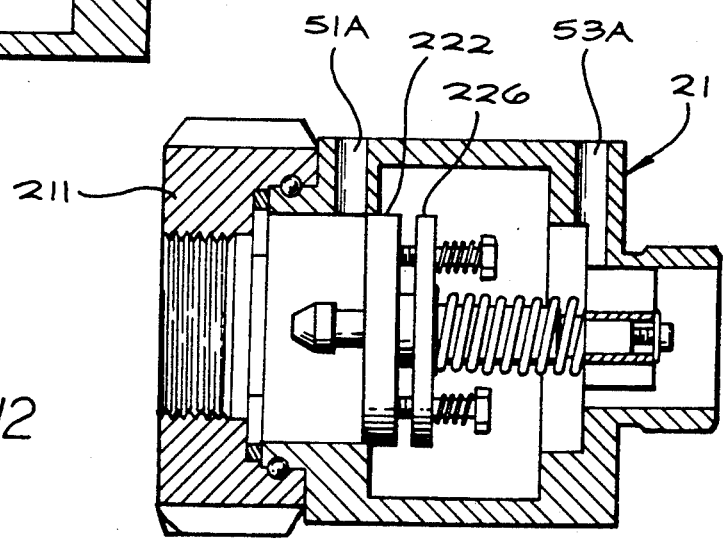

The precise metering of foam is accomplished by the metering valve 16 is important for maximum efficient use of foam. However, the operating conditions under which the foam must be proportioned varies dramatically and assurance of precise proportioning cannot be had over a broad range of flow rates without some form of flow compensation. In operation, the proportioner is connected in line with a fire fighting hose where the line pressure can vary PSI and flow rate from 0, with the nozzle closed, to e.g. 120 gallons per minute maximum flow in a small capacity system and from 60 to 350 gallons per minute in a high capacity system. Also, in normal fire fighting operations pressure and flow surges are normally to be expected. During all these conditions, the proportioner must maintain the pre-set foam percentage responsive to flow through the fire fighting line coupled to the system. This is reliably accomplished employing the differential pressure valve 21 of this invention. It may best be seen in FIG. 9, an exploded view in conjunction with FIGS. 10 through 12 showing the valve in the OFF, low-pressure and high-pressure conditions.

Now, reference is made to FIGS. 9-13 wherein, the differential pressure valve 21, in addition to the body 210 on its exterior includes a hose coupling ring 211, a high pressure line fitting 51 and a low pressure line fitting 53. The coupling ring 211 is, for example of the standard 2½" size and includes an internal race half 212A in which stainless steel ball bearings 213 travel while sealed from water pressure by gasket 214. The bearings 213 are loaded in the race 212 via the opening 217 in ring 211 and held in the race by set screw 218. Mating race half 212B is located in extension 215 of valve body 210. The coupling ring 212 is internally threaded to engage the supply hose fitting.

The body 210 includes two internal cavity sections, the high pressure section 220 communicating with the high pressure fitting 51 and the low pressure cavity 221, the latter of which is larger than the high pressure cavity 220 and communicates with the low pressure fitting 53. The high pressure inlet 51A to the fitting 51 is normally almost entirely closed by pressure plate 222 with a number of water flow holes 227 such as four in number and a central hole 223 which the valve plate 222 moves axially on shaft 224 against the resistance of spring 225 mounted on shaft 224.

Positioned downstream from the high pressure plate 222 is a low pressure plate 226 mounted for axial sliding movement on a pair of laterally displaced shafts 230 and 231 against the resistance of lower resistance springs 232 and 233. With the parts in the position shown in FIG. 10, the pressure plate closes the four holes in the plate 222 and there is no flow of water through the valve 21.

With low pressure, e.g. applied to the valve 21, as illustrated in FIG. 11, the pressure plate 226 moves off of the high pressure plate 222, flow begins through valve 21. Port 51A slightly open permitting water under pressure to pass through line 50, valve 14 and line 17 to exert pressure on bladder 40 and discharge fluid from the bladder 40, line 35, valve 14 and line 44 to valve 16 and line 52 into valve 21.

Figure 13A:
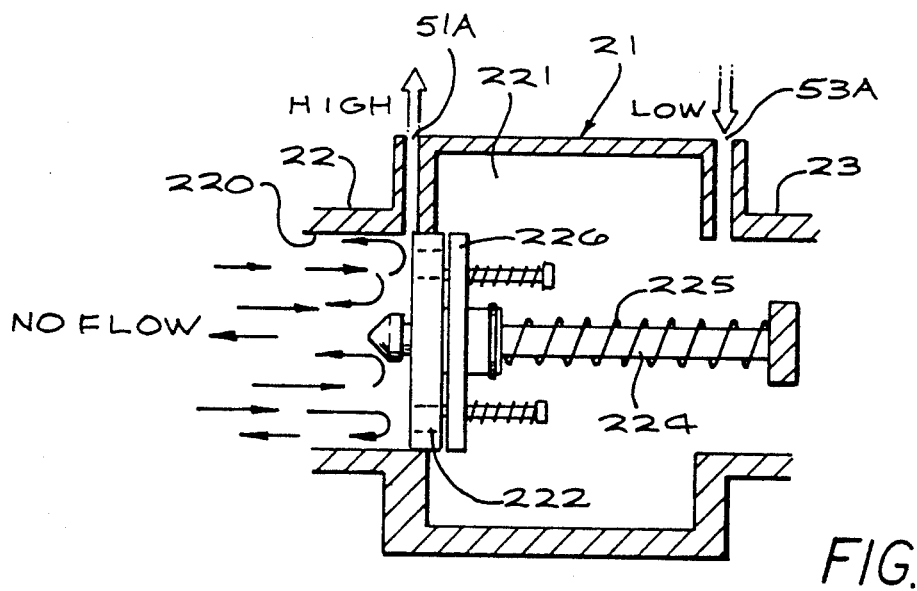
FIGS. 13A, 13B and 13C are fragmentary sectional views showing different operating positions for the elements of the differential pressure responsive valve.
Figure 13B:
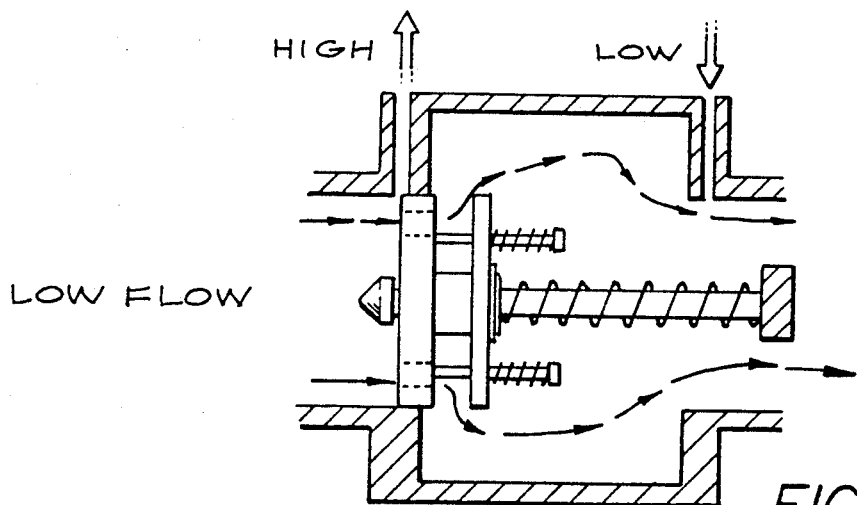
Figure 13C:
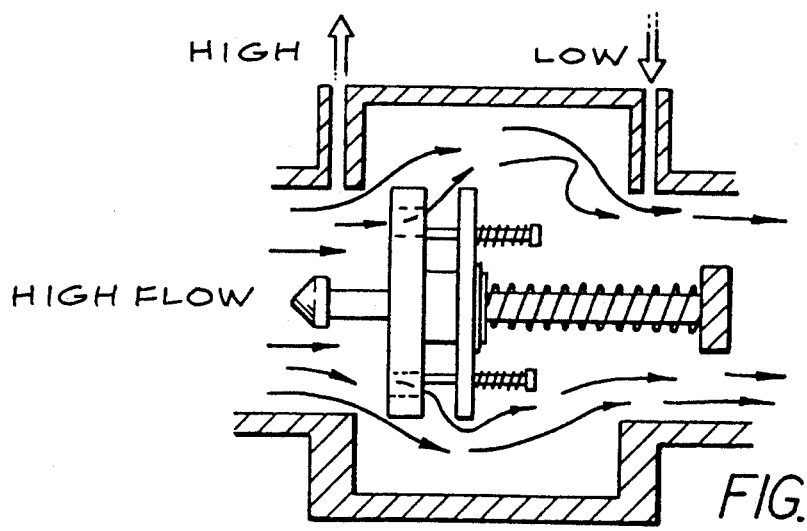

With greater pressure applied to the inlet of valve 21, as illustrated in FIG. 12, the high pressure plate 222 moves to the right in the drawing, FIG. 12 and port 51A is progressively opened during such movement so that its cross sectional area at any time reflects the inlet pressure. Together, ports 51A and 53A provide the differential pressure across the valve 21 for controlling the proportioning of foam concentrate. The greater the flow, the greater the pressure differential between ports 51a and 53A and the greater quantity of foam concentrate added to maintain the selected proportion. The flow of primary fire fighting fluid, i.e. water and of foam concentrate under the same three conditions is illustrated in FIG. 13A, closed. FIG. 13B, low flow and FIG. 13C, high flow.

The low pressure chamber 221 provides turbulent mixing of the foam concentrate and the fire fighting liquid for better mixing whether at low or high flow rates.

In typical tests of the system of this invention, the relationship between the flow rate through the line and the pressure differential at the pressure differential valve has been measured. below is a table of such data. It illustrates that the differential pressure which is used to inject the foam concentrate into the fluid flowing through the line is nearly directly proportional to flow rate. This is true even with line pressure varying between 60 to 125 psi.

| FLOW RATE OF WATER (gpm) | DIFFERENTIAL PRESSURE (psi) |
| --- | --- |
| 10 | 1 |
| 20 | 1.5 |
| 30 | 3.0 |
| 40 | 4.2 |
| 50 | 6.4 |
| 60 | 8.6 |
| 70 | 11 |
| 80 | 13 |

In other testing, a 40 gpm flow rate produced 5 psi differential pressure across the differential pressure valve while a flow rate of 120 gpm produces a differential pressure across the same valve of 15 psi.

OPERATING SEQUENCE

In order to use the system of this invention, the following sequence is followed:

FILLING SYSTEM

1. Connect the refill Line L to the hand pump 12 on top of the unit 10.
2. Dip line L into the 5 gallon drum of Class A wildland foam.
3. Set the metering valve 16 to 1% (maximum).
4. Set the selector valve 14 to REFILL position.
5. Pump hand pump 12. When the hand pump becomes hard to pump, turn the selector valve 14 to FOAM Position. This will allow any air build up to escape. Return Selector Valve to REFILL position and repeat until full.
6. When the unit is full of Class A wildland foam or A-FFF, the hand pump 12 will dead head. Do Not Force Hand Pump. NOTE: This is before first time operation or after repair and overhaul of unit.
7. Set selector valve 14 to OFF Position.
8. Disconnect refill line L and store in safe place. The system is now full of foam concentrate and ready for operation.

TO OPERATE THE SYSTEM WHEN FILL OF FOAM

1. Connect inlet side 22 of proportioner valve 21 to hose line using adapters to desired hose size, if needed.
2. Attach lost line to discharge side 23 of proportioner valve 21. If foam is desired, an air aspirating nozzle is attached to line or a compressed air system is in line on discharge side.
3. Turn metering valve 16 to desired foam setting. Note: For richer foam or when in cold weather, as viscosity thickens, increase setting. For leaner foam or when in hot weather, as viscosity thins, decrease setting.
4. When foam is desired, turn selector valve 14 to FOAM position. If only water is desired, turn selector valve to OFF position.
5. Load line by applying source pressure to the line. Shoot foam under the control of the nozzle valve. After all foam is discharged, foam concentrate will not be seen flowing down transparent line 44 from metering valve and foam will cease at nozzle. To refill at this point tank is full of water.

TO REFILL WHEN UNIT IS IN OPERATION

1. Turn selector valve 14 to REFILL.
2. Connect line L to hand pump inlet 30 and drum of foam concentrate.
3. Operate hand pump—foam will pump into bladder and discharge water down discharge line D. When all water is discharged and hand pump dead heads, unit is full of foam. This operation takes approximately 45 seconds.
4. Return Selector Valve to FOAM. During use the proportion of foam concentrate added may be adjusted at any time by dealing in the required proportion on metering valve 16.

The foregoing constitute the description of the best mode of this invention and is illustrative only of its principle and is not to be considered as limiting. Rather this invention is defined by the following claims including the protection provided by the doctrine of equivalents.

What is claimed is:

1. A differential pressure responsive valve comprising a cylindrical valve body having an inlet and an outlet and primary and secondary cavities, a valve seat between said cavities, a first valve plate having a passage therethrough, mounted within said valve body for movement axially thereof into and out of engagement with said valve seat, spring means for urging said first valve plate into engagement with said seat, a second valve plate mounted within said valve body for movement into and out of a position closing said passage through said first valve plate, spring means for urging said second valve plate into a position closing said passage through said first valve plate, and a port in said valve body having an opening interiorly thereof so positioned with respect to said first valve plate as to be at least partially closed by said first valve plate as an incident to movement thereof into and out of engagement with said valve seat;

said spring means being so proportioned in strength that, in response to rising pressure in said inlet cavity, said second valve plate first will be moved out of its position closing said passage in said first plate, following which said first valve plate will be moved out of its position separating said cavities.

2. A differential pressure responsive valve comprising a cylindrical valve body having an inlet and an outlet and primary and secondary cavities;

a valve seat between said cavities;

a first valve plate having at least one passage therethrough, mounted within said valve body for movement axially thereof into and out of flow constricting relationship with said valve seat;

spring means compressed between said first valve plate and said valve body for urging said first valve plate into flow constricting relationship with said valve seat;

a second valve plate mounted within said valve body for movement into and out of flow constricting relationship with the passage through said first valve plate;

spring means compressed between said first valve plate and said second valve plate urging said second valve plate into flow constricting relationship with the passage through said first valve plate;

said spring means being so proportioned in strength that, in response to rising pressure in said inlet cavity, said second valve plate first will be moved away from flow constricting relationship with said passage in said first plate, following which said first plate will be moved away from flow constricting relationship with said valve seat.

3. A differential pressure responsive valve according to claim 2 in which there are a plurality of said passages through said first plate which are distributed symmetrically over the surface of said plate, and in which said second valve plate is movable into flow constricting relationship with said plurality of passages.

* * * * *